Nov. 5, 1940. H. C. JOHANSEN Re. 21,616

ROTARY DRILLING APPARATUS

Original Filed July 7, 1936

Inventor:
Harry C. Johansen.
by Louis A. Waxom.
Atty.

Reissued Nov. 5, 1940 Re. 21,616

UNITED STATES PATENT OFFICE 21,616

ROTARY DRILLING APPARATUS

Harry C. Johansen, Michigan City, Ind., assignor to Sullivan Machinery Company, a corporation of Massachusetts Original No. 2,192,192, dated March 5, 1940, Serial No. 241,450, November 19, 1938, which is a division of application Serial No. 89,300, July 7, 1936. Application for reissue August 29, 1940, Serial No. 354,755

10 Claims. (Cl. 255—22)

This is an application for reissue of Letters Patent No. 2,192,192, granted March 5, 1940.

This invention relates to rotary drilling apparatus, and more particularly to an improved feeding, guiding and driving means for the drill rod rotating member of a rotary drilling apparatus.

An object of this invention is to provide an improved hydraulic drill rod feeding means for a rotary drilling apparatus. Another object is to provide an improved feeding and guiding structure for the drill rod rotating member. A further object is to provide improved driving means for the drill rod rotating member. Still another object is to provide an improved means for guiding the drill rod during the feeding operation. A still further object is to provide an improved feeding and guiding structure for a drill rod wherein elements of the feeding means also serve as elements of the guiding means. Yet another object is to provide an improved flexible, self-adjusting driving connection between the source of power and the drill rod rotating member whereby the latter may be driven irrespective of its feeding position along its guideways. Still another object is to provide an improved feeding apparatus including a crosshead guided on the feed cylinders and carrying thereon between the feed cylinders a chuck for movement therewith relative to the cylinders, the construction being such as to facilitate positioning relative to the chuck of an upright element to be gripped thereby and fed. A further object is to provide an improved drill rod feeding and guiding structure which is extremely rugged and compact. These and other objects and advantages of the invention will, however, hereinafter more fully appear.

The subject matter of this application has been divided out of my copending application Serial No. 89,300, filed July 7, 1936.

In the accompanying drawing there is shown for purposes of illustration one form which the invention may assume in practice.

Figure 1:
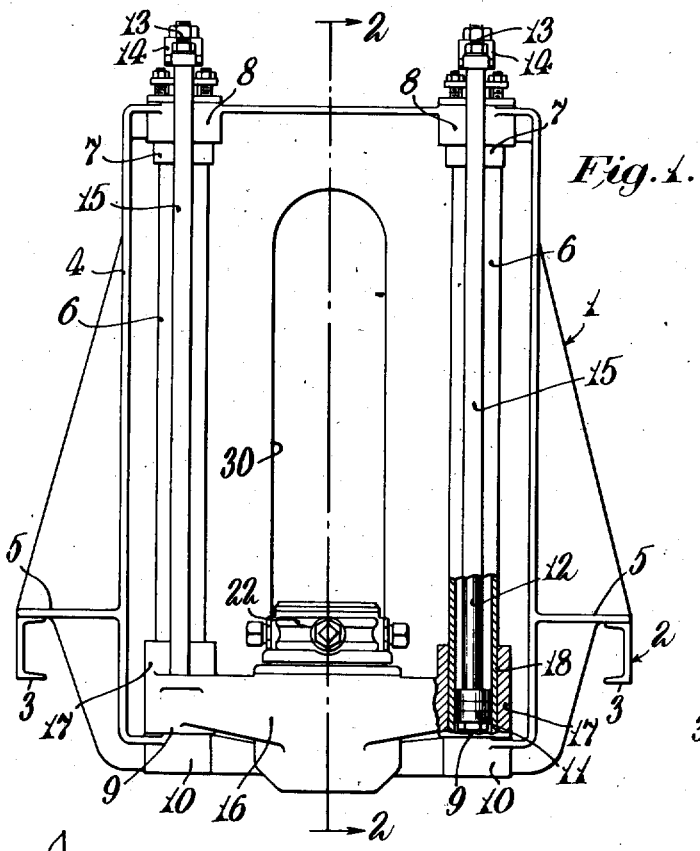
Fig. 1 is an end elevational view, with parts shown in vertical section, showing an illustrative form of the improved drill rod feeding, guiding and rotating means.
Figure 2:
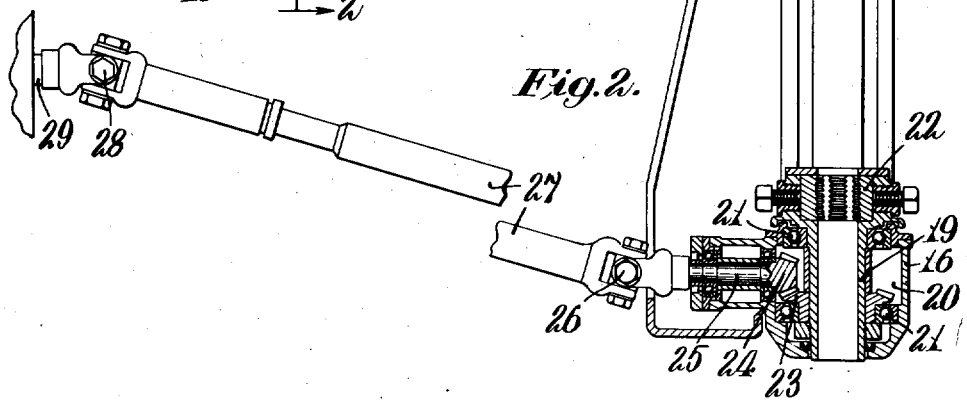
Fig. 2 is a vertical sectional view taken substantially on line 2—2 of Fig. 1.

In this illustrative embodiment of the invention, the improved drill rod feeding, guiding and rotating means generally designated 1 is adapted for embodiment in a rotary drilling apparatus of the portable automobile type and to be driven through the conventional automobile transmission by the automobile engine. The conventional automobile chassis is generally indicated at 2 in Fig. 1 and includes a platform having parallel side frames 3, 3 on which the frame 4 of the feeding, guiding and rotating means 1 is mounted, the frame 4 having lateral brackets 5 resting on and fixed in any suitable manner to these side frame members. The drilling apparatus mounted on the platform of the automobile chassis embodies conventional hoisting mechanism, a mud pump for supplying drilling fluid to the drill hole and a fluid pump for supplying liquid under pressure to the feeding means, and these several members of the drilling apparatus are adapted to be driven by the engine of the automobile.

Now referring to the improved drill rod feeding, guiding and rotating means 1, it will be noted that the frame 4 thereof has mounted thereon in a position projecting upwardly above the automobile chassis platform, parallel vertical feed cylinders 6, 6, the latter having top heads 7, 7 supported within the upper frame brackets 8 and bottom heads 9, 9 supported with the lower frame brackets 10. The frame brackets 8 and 10 have bores for receiving the ends of the feed cylinders and the cylinder heads so that the feed cylinders are rigidly supported in position on the frame. Reciprocably mounted in the feed cylinders are feed pistons 11 secured to piston rods 12, the latter herein extending upwardly through the packed top heads 7 of the feed cylinders. Secured at 13 to the upper ends of the piston rods and arranged above the feed cylinders are transverse frames 14 in turn having secured thereto parallel connecting rods 15 herein extending downwardly along the opposite sides of and arranged parallel with the feed cylinders in the manner shown. These depending connecting rods 15 are secured at their lower ends to a transverse frame or sliding crosshead 16 extending horizontally across the space between the parallel feed cylinders 6 and formed at its opposite ends with cylindrical guides 17 slidably guided at 18 for up and down sliding movement on the cylindric exterior surfaces of the parallel feed cylinders. Journaled in this transverse frame or sliding crosshead 16 and located centrally between the feed cylinders is a vertical drive sleeve 19, and the frame 16 has a chamber 20 in which are supported vertically spaced anti-friction bearings 21, 21 in which the sleeve is journaled. The drive sleeve carries a top chuck 22 of the conventional screw operated, jaw type for connecting a conventional drill rod, extending centrally through the sleeve, to the sleeve for rotation therewith. It will be noted that the space above the chuck and crosshead is clear of obstructions which would interfere with the lateral movement, just above the crosshead and chuck, of the lower end of an upright element to be received in the chuck into alinement with the latter.

The improved means for rotating the drive sleeve 19 to effect drill rod rotation comprises a bevel gear 23 keyed to the sleeve and suitably journaled in the sliding crosshead 16, and meshing with and driving this bevel gear is a bevel gear 24 fixed to a horizontal shaft 25 likewise suitably journaled within the sliding crosshead. The shaft 25 is connected through a universal joint 26 to a telescopic, self-adjusting drive shaft 27, the latter in turn connected through a universal joint 28 to a horizontal longitudinally extending transmission shaft 29 operatively connected to an element of the automobile transmission. The rear wall of the drill frame 4 is slotted vertically at 30, so that when the crosshead 16 is slid rectilinearly along the parallel feed cylinders the slot permits free movement of the shaft 25, universal joint 26 and shaft 27 with the crosshead, so that, irrespective of the position of the latter, the drive sleeve 19 may always be driven. Fluid under pressure is adapted to be supplied to the opposite ends of the feed cylinders 6 through suitable conduits connected to the fluid pump of the drilling apparatus under the control of suitable valve means, so that the feed pistons 11, 11 may be fed either upwardly or downwardly within the feed cylinders. When the feed pistons assume their lowermost positions within their feed cylinders, the crosshead 16 is located at the bottoms of the feed cylinders, as shown in the drawing. Of course, when the drill rod is fed in either of opposite directions by the feed pistons, the drill rod may simultaneously be rotated through the flexible, self-adjusting drive connections.

As a result of this invention, it will be noted that an improved feeding and guiding structure is provided whereby the drill rod of a rotary drilling apparatus may be fed and guided in an improved manner. It will further be evident that by utilizing elements of the feeding means as elements of the guiding means, the structure is rendered comparatively simple, rugged and compact in design. It will further be evident that by the provision of the improved sliding crosshead structure and the telescopic, self-adjusting driving connections, the drill rod may be fed either upwardly or downwardly along the parallel feed cylinders while at the same time it may be rotated in an improved manner. Also by the provision of the improved drill arrangement by which the chuck is carried by the sliding crosshead structure between the feed cylinders, and the crosshead is connected, as shown and described, to the feed pistons, there is provided a clear space above the chuck so that an upright element to be gripped by the chuck can be moved laterally, with its bottom just above the top of the chuck and crosshead, into axial alinement with the chuck. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a drilling apparatus, the combination comprising a frame, parallel feed cylinders supported by said frame, a crosshead slidably guided on said cylinders, pistons contained in said cylinders and having upwardly extending piston rods, connections between the upper ends of said piston rods and said crosshead, drill rod rotating means journaled on said crosshead, and driving means mounted on said frame and relative to which said crosshead is movable, for driving said rotating means irrespective of the position of said crosshead relative to said cylinders.

2. In a drilling apparatus, the combination comprising a frame, hydraulic feeding means on said frame including feeding elements providing a vertical guideway, a crosshead slidably guided on said guideway, means for supplying hydraulic pressure to said feeding means to effect movement of said crosshead vertically along said guideway, drill rod rotating means journaled on said crosshead, and driving means for said rotating means including a driving element journaled on said frame, a driving element journaled on the crosshead, and a universal telescopic torque shaft connection between said driving elements whereby said rotating means may be driven irrespective of the position of said crosshead along its guideway.

3. In a drilling apparatus, the combination comprising parallel feed cylinders, pistons reciprocable in said cylinders, a crosshead guided on said cylinders, means for connecting said pistons to said crosshead whereby movement of said pistons in said cylinders effects movement of said crosshead along said cylinders, drill rod rotating means mounted on said crosshead, and self-adjusting means for driving said rotating means irrespective of the position of said crosshead relative to said feed cylinders and including driving elements relative to which said crosshead is bodily movable.

4. In a drilling apparatus, the combination comprising parallel feed cylinders, pistons reciprocable in said cylinders and having projecting piston rods, a crosshead guided on said cylinders, connecting rods extending along the sides of said cylinders for connecting said piston rods to said crosshead whereby movement of the pistons in said cylinders effects movement of said crosshead along said cylinders, drill rod rotating means mounted on said crosshead, and means for driving said rotating means irrespective of the position of said crosshead relative to said cylinders and including driving elements relative to which said crosshead is bodily movable.

5. In a drilling apparatus, the combination of a support, a pair of vertical feed cylinders extending upwardly from said support, feed pistons reciprocable in said cylinders, a crosshead slidably guided on said cylinders and operatively connected to said feed pistons whereby movement of said feed pistons in said cylinders effects movement of said crosshead along said cylinders, drill rod rotating means mounted on said crosshead, and self-adjusting driving connections for said rotating means for driving the latter irrespective of the position of said crosshead relative to said feed cylinders and including a driving element mounted on said support and relative to which said crosshead is bodily movable.

6. In a drilling apparatus, the combination of a pair of parallel feed cylinders supported at an angle to the horizontal in a stationary position, feed pistons reciprocable in said cylinders and having upwardly extending piston rods projecting through the top cylinder heads, a crosshead slidably guided on said cylinders therebetween and disposed near the lower ends of said cylinders when said pistons are at the lower cylinder ends, connecting rods extending parallel with and along the sides of said cylinders for connecting the upper ends of said piston rods to said crosshead whereby movement of said pistons in said cylinders effects movement of said crosshead along said cylinders, and drill rod rotating means mounted on said crosshead.

7. In a drilling apparatus, the combination comprising hydraulic feed cylinder and piston feeding means including a feed cylinder containing a reciprocable feed piston, drill rod rotating means including a rotary member having an opening adapted to receive a drill rod, means for slidably guiding said drill rod rotating means including a sliding crosshead on which said rotary member of said rotating means is mounted, said crosshead having a portion slidingly engaging the exterior surface of said feed cylinder, an operative connection between said feed piston and said crosshead, and means for rotating said rotating means irrespective of the position of said crosshead relative to said cylinder including a drive member operatively connected to said rotary member and relative to which said crosshead is slidable.

8. In a drilling apparatus, the combination comprising a support, a pair of parallel, vertically arranged feed cylinders mounted on said support, feed pistons reciprocable in said cylinders, a crosshead slidably guided on said cylinders therebetween, operative connections between said feed pistons and said sliding crosshead, drill rod rotating means mounted on said crosshead, and means for driving said drill rod rotating means irrespective of the position of said crosshead along said cylinders including a shaft journaled in said crosshead, a drive shaft journaled on said support and a self-adjusting driving connection between said shafts.

9. In a drilling apparatus, the combination comprising a frame, a pair of parallel, vertically arranged, hydraulic feed cylinders mounted on said frame, feed pistons reciprocable in said cylinders, a support arranged between and guided on said cylinders and movable relative thereto in a direction longitudinally thereof, operative connections between said feed pistons and said support, drill rod rotation means mounted on said support, and means for driving said rotation means irrespective of the position of said support relative to said cylinders including a drive member journaled in said support, a drive member journaled on said frame, and a self-adjusting driving connection between said drive members.

10. In a drilling apparatus, a support, laterally spaced, upright cylinders mounted on said support and having cylindrical peripheral surfaces providing guides, a crosshead having portions slidably engaging the cylindrical peripheral surfaces of said cylinders to guide said crosshead, said crosshead having thereon between said cylinders a rotatably mounted chuck arranged for rotation on an axis parallel to and between the axes of said cylinders, pistons in said cylinders, piston rods extending through the upper ends of said cylinders, operative connections between the upper ends of said piston rods and said crosshead including rods extending downwardly alongside said cylinders when said pistons are in lowered positions and connected at their lower ends to said crosshead, said crosshead being disposed near the lower ends of said cylinders when said pistons are adjacent the lower ends of said cylinders and said cylinders being so spaced and said operative connections being so formed that said crosshead may move upwardly and downwardly along the cylinders from points adjacent the upper ends thereof to points adjacent the lower ends thereof, and the space above said crosshead and chuck being clear at least in line with the chuck to permit the lower end of an upright element to be gripped in the chuck to be moved laterally at an elevation just above the chuck and crosshead into and out of alinement with the chuck.

HARRY C. JOHANSEN.